United States Patent [19]

Russo

[11] Patent Number: 4,690,240

[45] Date of Patent: Sep. 1, 1987

[54] ANTI-THEFT EXHAUST SYSTEM FOR VEHICLES

[76] Inventor: Rudolph P. Russo, 35 Market St., Poughkeepsie, N.Y. 12601

[21] Appl. No.: 718,468

[22] Filed: Apr. 1, 1985

[51] Int. Cl.$^4$ ............................................. B60R 25/00
[52] U.S. Cl. ............................... 180/287; 307/10 AT
[58] Field of Search ............... 180/287, 289, 296, 309; 307/10 AT; 251/305, 129.04

[56] References Cited

U.S. PATENT DOCUMENTS

| | | | |
|---|---|---|---|
| 2,819,770 | 1/1958 | Gibbs | 307/10 AT |
| 2,895,571 | 7/1959 | Hanebeck | 251/305 |
| 3,544,804 | 12/1970 | Gaumer | 180/287 |
| 3,698,505 | 10/1972 | Webley | 180/287 |
| 3,756,341 | 9/1973 | Tonkowich | 180/287 |
| 3,800,279 | 3/1974 | Thompson | 180/287 |
| 3,851,504 | 12/1974 | Theobald | 70/255 |
| 4,209,709 | 6/1980 | Betton | 180/287 |
| 4,232,758 | 11/1980 | Crosas | 307/10 AT |
| 4,292,541 | 9/1981 | Ambrosius | 180/287 |
| 4,463,340 | 7/1984 | Adkins | 180/287 |

Primary Examiner—John J. Love
Assistant Examiner—Karin L. Ferriter

[57] ABSTRACT

Automotive anti-theft device which includes an electrically operable valve disposed in the engine exhaust system in association with electrically operable valve actuating means responsive to a predetermined sequence of remotely generated electrical signals.

6 Claims, 4 Drawing Figures

ANTI-THEFT EXHAUST SYSTEM FOR VEHICLES

This invention relates to anti-theft devices for automotive vehicles.

The ever growing number of auto thefts and the increased sophistication of auto thieves has created an expanding need for impeding, if not preventing, vehicle operation by unauthorized individuals. Typically, anti-theft systems have operated by disabling one or more functions necessary to permit operation of a vehicle. Starting with the simple ignition key lock, manufacturers have adopted a series of such devices, and today's car typically includes means for disabling the steering mechanism and gear shift mechanism in conjunction with the switching off of the ignition key lock.

However, as the use of such expedients has increased, so has the knowledge of car thieves to circumvent such devices. In order to impede such thieves, many motorists have installed auxiliary anti-theft devices in addition to those supplied by the manufacturer. Such devices have taken the form of auxiliary ignition system disabling locks, starter disabling locks, and even hidden valves to shut off fuel flow. For example, Crossas, U.S. Pat. No. 4,232,758, discloses electrically operable valves which are opened in the piping of a brake line, a clutch line and/or a fuel line by an electrical current initiated by depressing a plurality of push-button switches in a predetermined sequence.

Similarly, Theobald, U.S. Pat. No. 3,851,504 discloses a combination lock for starters using a locking member which interferes with the starter solenoid in all positions but one, to which it is stepped by a predetermined series of functions. Tonkowich et al., U.S. Pat. No. 3,756,341, discloses a normally closed fuel valve which is only opened upon receipt of an electric signal from a tamperproof electric control box. The valve opening signal is fed from the control box only when a particular code is entered into the box by depressing several selected control buttons. Similar systems are disclosed in Gibbs, U.S. Pat. No. 2,819,770, and in Gaumer, U.S. Pat. No. 3,544,804. Webley, U.S. Pat. No. 3,698,505; Schull, U.S. Pat. No. 4,050,063; and Thompson, U.S. Pat. No. 3,800,279 all employ keys to control auxiliary brakelocks, the ignition system, or alarm systems.

The present invention may be briefly described as an improved anti-theft device that includes, in its broad aspects, the disposition of the operative enabling device in the engine exhaust system of a vehicle. In its narrower aspects, the subject invention includes the disposition of a closure valve in the exhaust manifold controlled by a decoder type control unit disposed in an effectively tamperproof housing in which receipt of a preselected sequence of coded signals actuates a solenoid which opens the valve to clear the exhaust conduit and permit vehicle operation. Said coded signals are initiated from a control panel, preferably a keyboard, desirably located within the vehicle cockpit.

Among the advantages of the subject invention is a security system associated with the functioning of the vehicle exhaust system which, not only is essential for engine operation, but is also relatively inaccessible for disablement operations.

Another advantage is the location of a decoder-actuator unit for the exhaust control valve assembly in the valve assembly itself at an inaccessible location remote from the control signal input. Further advantages include the provision of means for impeding the rapid decoding of the control system signals by automatic scanning decoding devices, the provision of a foolproof override system, and the provision of memory retention in the microprocessor upon disconnection of the battery.

The object of the invention is the provision of an improved anti-theft device for automobiles.

Other objects and advantages of the subject invention will become apparent from the following portions of this specification and from the appended drawings which illustrate, in accord with the mandate of the patent statutes, a presently preferred embodiment of an anti-theft device for automobiles that incorporates the principles of this invention.

DETAILED DESCRIPTION OF THE PREFERRED EMBODIMENT

Figure 1:
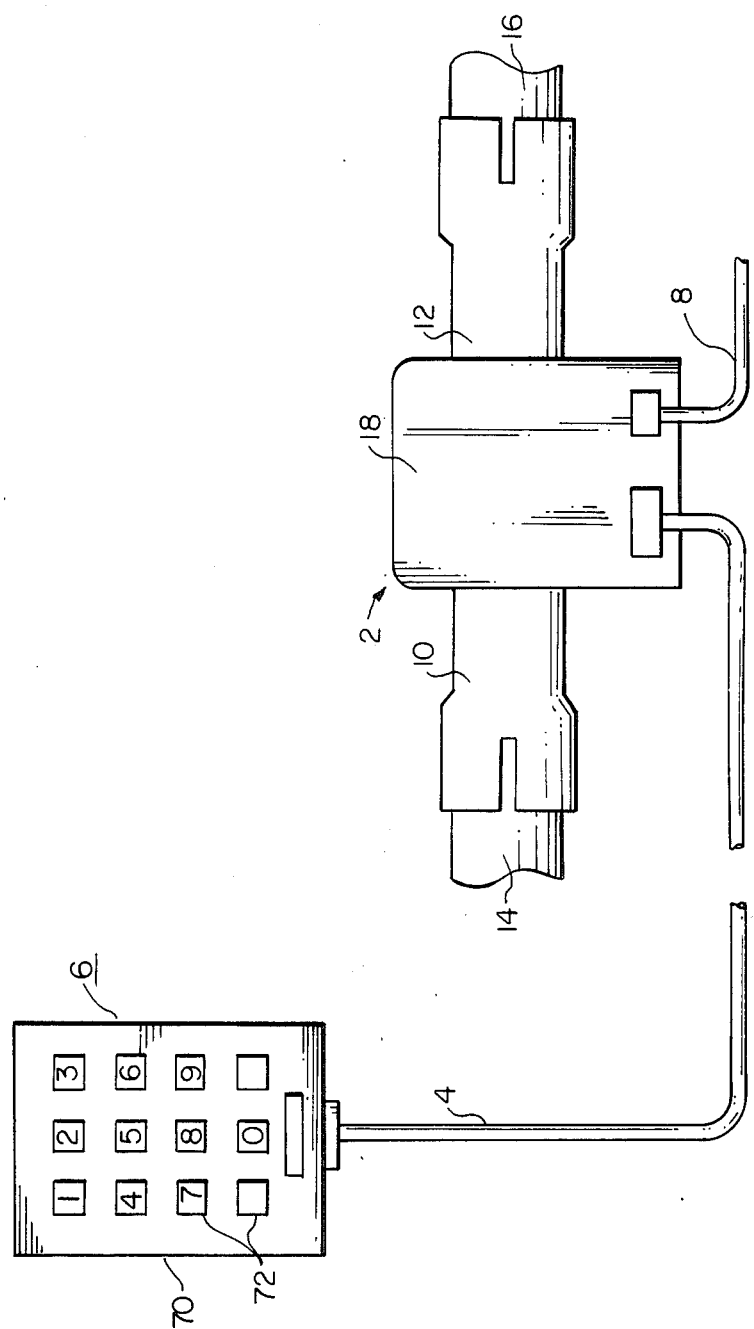
FIG. 1 is a schematic system diagram of the two major system components, i.e., the control panel and the control valve assembly.

Turning now to the drawings and initially to FIG. 1, there is provided a control valve assembly, generally designated 2, incorporated in the vehicle exhaust system and connected by an electrical cable 4 to a control panel 6. A second cable 8 connects the valve assembly 2 to the vehicle electrical power source, such as a 12 volt battery (not shown).

Figure 2:
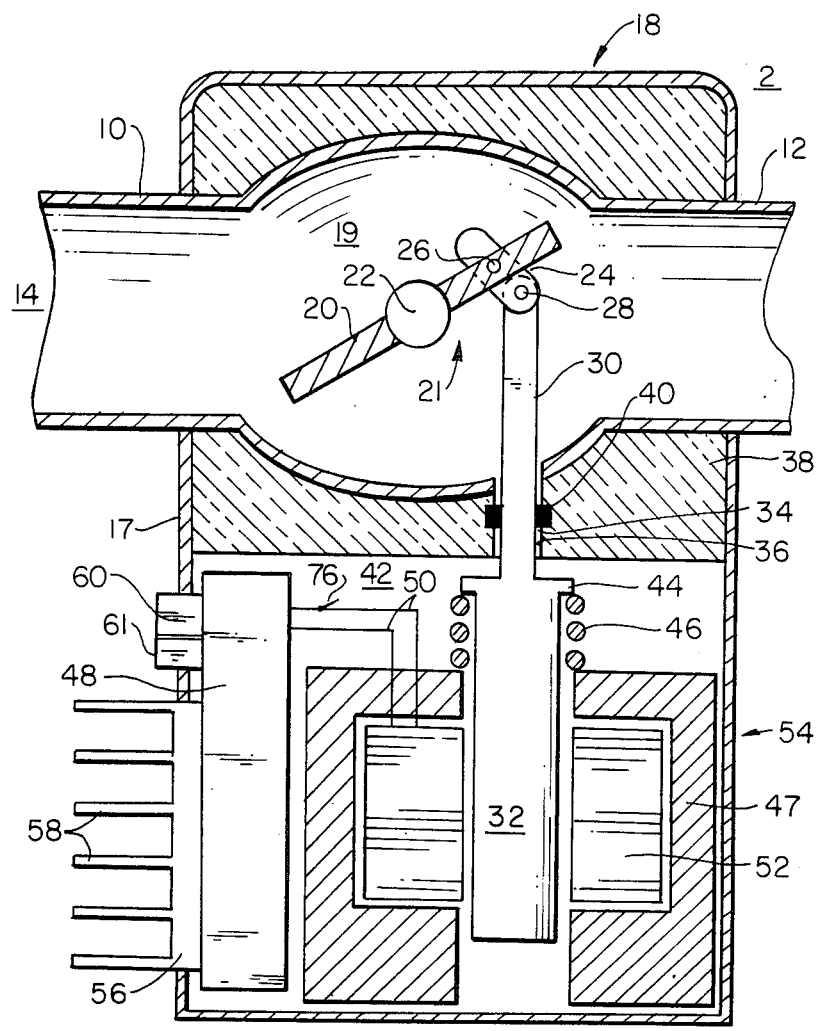
FIG. 2 is a schematic vertical section of the control valve assembly.

As shown in FIG. 2, the control valve assembly 2 generally includes a pair of exhaust pipe couplers 10, 12 disposed on opposite sides of a valve housing 18 sized and configured as to facilitate installation, in the manner of a muffler, to a section of a vehicle exhaust duct 14, 16. Expanded split pipes and clamps may be used as shown, or other interconnections may be employed. Mounting is preferably located closely adjacent the output end of the exhaust manifold. Alternatively, location of the control valve assembly closely adjacent the input side of the muffler can also be employed since any attempt to defeat the closed valve by cutting open the exhaust duct 14 upstream of the control valve assembly 2, will, apart from the difficulties inherent therein, result in a loud unmuffled exhaust, making the car far more conspicuous and possibly bringing the vehicle under police scrutiny.

FIG. 2 shows a preferred construction for the control valve assembly. The output terminal of the exhaust manifold or an upstream length of exhaust duct 14 is connected to coupler 10 which leads through the wall 17 of a tamper resistant housing 18 and into a valve chamber 19. The valve chamber 19 is in fluid communication with the downstream coupler 12 on the opposite side. A suitable flow control valve, generally designated 21, preferably comprised of a butterfly valve plate 20, is rotatably mounted within the valve chamber 19. Valve chamber 19 is so sized that the cross sectional area occupied by gas of any plane across its exhaust flow path, with the valve plate 20 open, is at least equal to the cross sectional area inside of couplers 10 and 12.

The valve plate 20 is displaceable from open to closed positions by a solenoid assembly, generally designated 54, disposed within the housing 18. The armature 32 of the solenoid includes an extending rod 30, the end of which is pivotally connected to a link 24, as at 28. The other end of the link is pivotally connected to the valve plate 20, as at 26. The armature rod 30 passes through sleeve 34 in the wall 36 of valve chamber 19. The sleeve 34 supports suitable seals 40 to effectively seal off the hot exhaust gases which pass through the valve chamber 19. The valve chamber is surrounded by a layer of thermal insulation 38 to thermally isolate valve assembly from the solenoid 54 and from the decoder-actuator 48 which are also disposed within the housing 18.

Solenoid armature 32 is normally biased into advanced position by a spring 46 disposed intermediate a flange 44 and solenoid coil 47 to normally bias the butterfly valve plate 20 into closed position. Such a normally closed position renders the vehicle inoperable.

Solenoid actuation to effect opening displacement of valve plate 20 is caused by application of a suitable output voltage from a decoder-actuator unit 48 via leads 50 to the solenoid coil 47. When so energized the armature 32 is retracted causing link 24 to rotate butterfly valve 20 into an open position, where it will remain as long as the solenoid coil is energized. With the butterfly valve 20 in such an open position, the vehicle is rendered operable. Valve assembly 20, the solenoid control unit 54, and decoder-actuator unit 48 are all contained within tamper resistant housing 18, which also desirably includes an aluminum heat sink 56 having cooling fins 58.

Figure 3:
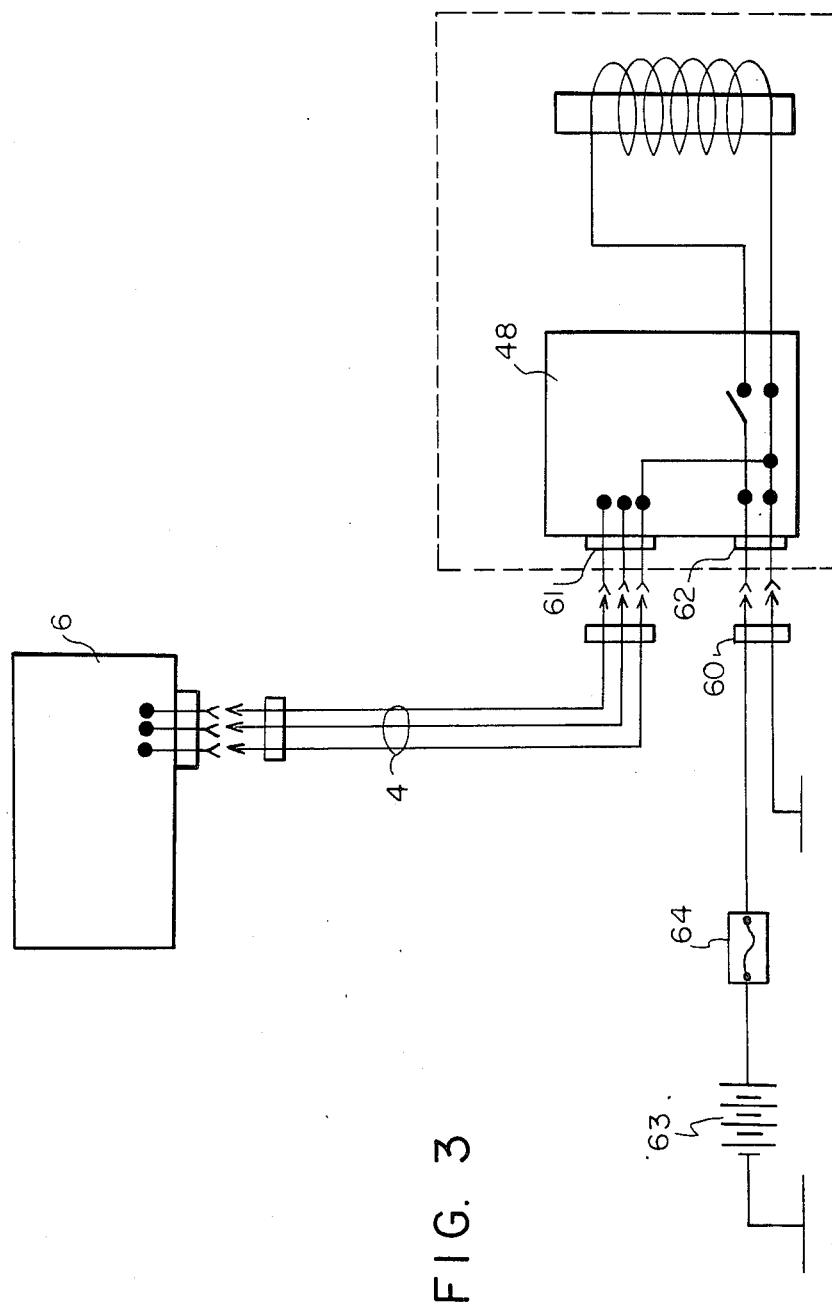
FIG. 3 is a schematic block diagram showing the nature of the electrical connections between the keyboard, the decoder-actuator and solenoid of the control valve assembly, and the vehicle electrical power supply.

Standard wire connectors 61, 62 are provided outside of the housing 18 to permit electrical interconnections of the decoder-actuator unit 48 to the vehicle battery and, in one embodiment of this invention, to the control panel 6, as is shown schematically in FIG. 3.

As shown in FIG. 3, power is provided directly by the vehicle battery 63, via a fusible link 64 and connector 60.

The second connector 61 functions to couple the vehicle battery to control panel 6, and to transmit signals from the control panel 6, via a shielded cable 4, to actuate the decoder-actuator unit 48 and operate the solenoid.

Figure 4:
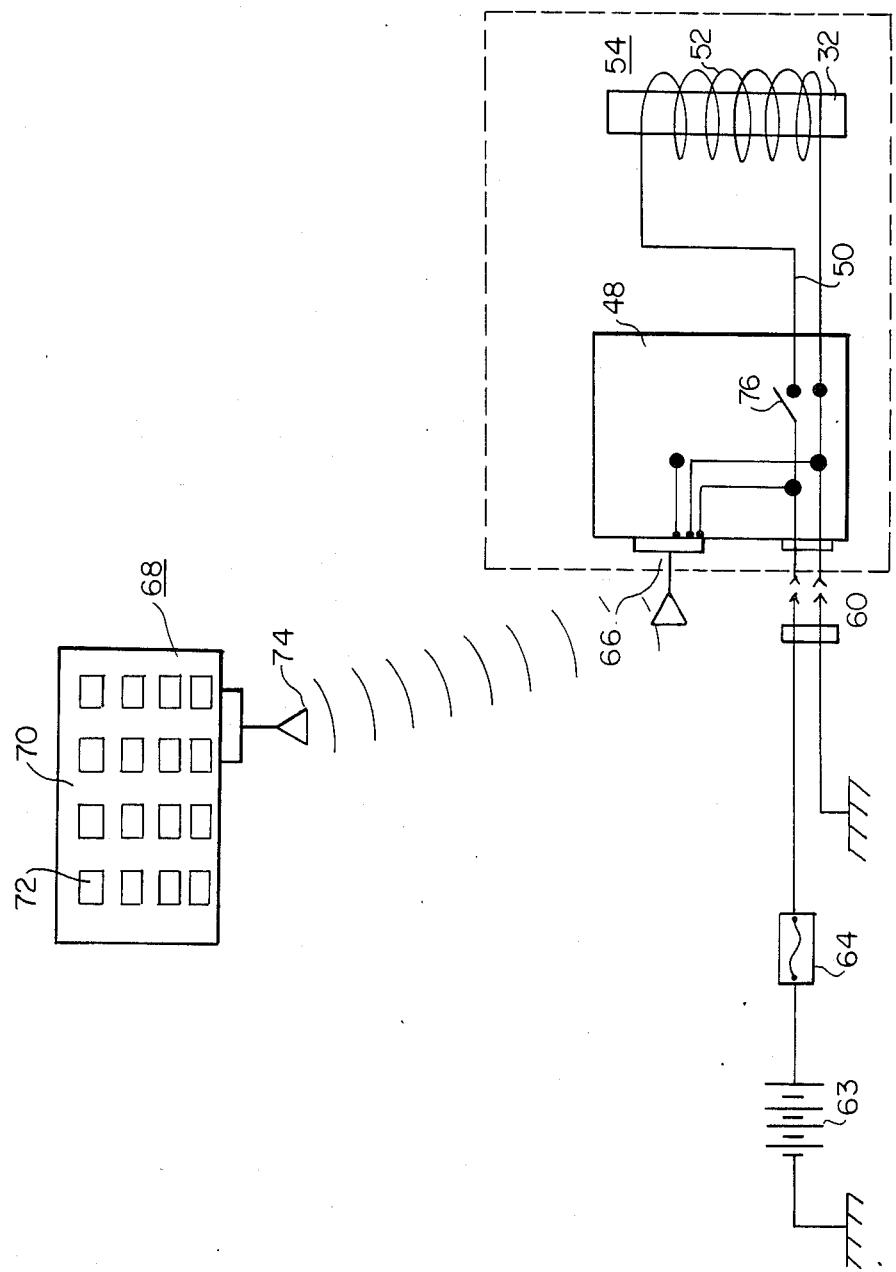
FIG. 4 is a block diagram similar to FIG. 3, but showing an embodiment using a transmitter and receiver rather than a cable to transmit the signal from keyboard to the valve assembly.

Alternatively the interconnection between the control panel 6 and the decoder-actuator unit 48 may be in the form of a high frequency wireless link represented by the transmitter 74 and receiver 66 units associated with the control panel 6 and decoder-actuator unit 48 as schematically shown in FIG. 4.

Many types of control signal patterns may be used. A series of discrete signals of differing frequencies would conveniently meet the requirements.

In both the cable linked and the transmitter linked embodiments, the control panel 6 desirably includes a keyboard 70 having a plurality of keys 72, labeled either alphabetically and/or numerically. Each key 72 controls a switch such that, when a key 72 is depressed, it closes a circuit and stimulates the emission of a discrete signal which is unique to that key 72. An example of a suitable keyboard means is the conventional tone generating telephone dialing keyboard, which has the advantage of already being mass produced and marketed at low cost. Somewhat greater security may be obtained using key code signals unique to a manufacturer's own key system, but probably at greater costs of manufacture and of obtaining replacement parts.

Each unique keyed signal is sent, by cable means 4, as shown in FIG. 3, or by transmitter 74, as in FIG. 4, to the connector socket 61 (FIG. 3) or to the receiver 66 (FIG. 4). In FIG. 4 the transmitted key signal is received and transduced by receiver 66 into an electrical signal. In FIG. 4 the key signal remains in electronic form. In both cases the electronic keyed signal is directed to the decoder-actuator unit 48. Said decoder-actuator unit 48 preferably is in the form of a microprocessor, which is programmed to respond to a preselected sequence of signals generated at the keyboard 70. Upon reception of the proper preprogrammed signal sequence, the microprocessor 48 operates to close a switch 76, which in turn completed the energization circuit for the solenoid 54 and opens the valve plate 20 as explained above.

As indicated above, the decoder 48 is preferably a programmable microprocessor responsive to a sequence of signals remotely transmitted thereto, which sequence is compared to a signal sequence previously programmed into the memory of the microprocessor 48. Such microprocessor chips are readily designed and built to special orders by most major manufacturers. The microprocessor 48 is primarily energized by the automobile battery 63 but also desirably contains other storage means, such as a capacitor or small rechargeable battery (not shown), to maintain the preprogrammed memory in the event of the battery failure or the like. Alternatively, a complementary metal-oxide semiconductor (CMOS) chip may be used which is capable of retaining memory without a constant power supply.

The described system may be designed to operate by transmitting a sequence of numbers corresponding to differing frequencies, or alternatively, a combination of such numbers, typically between four and seven in number. The latter yields more permutations but in either case a suitably large number is possible. The described system is such that the microprocessor 48 may be programmed to respond to any desired sequence or combination of keys 72 on the keyboard 70; however, to prevent programming by unauthorized persons, the command signal to program should only be accepted while the engine is operating. It is also possible to design the control box in such manner that a single key 72 action will produce the entire sequence of signals necessary to actuate the solenoid 54 (in the same manner that an automatic redial operates on a telephone). Automatic redial is mainly of interest where a portable remote transmitter serves as the keyboard means. A further desirable feature that may be built into the device is the ability to lock the exhaust valve 20 in the open position for convenience on those occasions when the vehicle will be left in a secure location. Again for security reasons this command would only be accepted if delivered while the engine is running.

Similarly the microprocessor 48 may be programmed to de-energize the solenoid 54 and disable the exhaust either upon depression of a specified command key, or automatically if the engine remains off for a predetermined interval. A conductor from an oil pressure indicator circuit may be used to inform the microprocessor 48 when the engine is on, or a transducer sensing exhaust temperature or exhaust pressure can be included in the control valve assembly 2.

To prevent professional car thieves from decoding the system using available rapid scanning devices and decoders, a time delay is required in the system whereby an interval of typically half a second must elapse between signal inputs of the sequence for them to be accepted. This precaution would ensure that any such automatic decoding cycle would require extended periods of time to solve the code system.

Having thus described my invention, I claim:

1. An automotive anti-theft device comprising valve means disposed in the engine exhaust conduit intermediate the exhaust manifold and downstream noise suppression means and displaceable between a first position permitting exhaust gas flow therepast and a second position effectively precluding the flow of exhaust therepast to prevent engine operation;

electrically operable valve actuating means for displacing said valve means intermediate said first and second positions;

housing means enclosing said valve means and valve actuating means for impeding physical access thereto, means for remotely generating a multiplicity of different sequences of discrete electrical signals;

means selectively responsive to a single predetermined sequence of said discrete electrical signals to energize said valve actuating means.

2. The automotive anti-theft device as st forth in claim 1 wherein said last mentioned means comprises a programmable microprocessor and said signal generating means comprises a manually operable keyboard located remote from said microprocessor.

3. A device according to claim 2 in which said valve means is automatically closed after the engine has remained off for a selected interval of time.

4. A device according to claim 2 in which the signal responsive means will only respond to said predetermined sequence of coded signals where signals are separated by a predetermined interval of time.

5. A device according to claim 2 in which the predetermined sequence of signal may be reprogrammed to selectively respond only to a new sequence of signals by the keyboard operator only while the engine is running.

6. The automotive anti-theft device as set forth in claim 1 wherein said signals responsive means is disposed within said housing and said valve means is thermally isolated from said valve actuating means and signal responsive means by interposed thermal insulating material.

* * * * *